United States Patent
Nishimura

(10) Patent No.: US 6,510,009 B2
(45) Date of Patent: Jan. 21, 2003

(54) WIDE-ANGLE ZOOM LENS AND PHOTOGRAPHING APPARATUS USING THE SAME

(75) Inventor: Kazuya Nishimura, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/817,212

(22) Filed: Mar. 27, 2001

(65) Prior Publication Data

US 2001/0033430 A1 Oct. 25, 2001

(30) Foreign Application Priority Data

Mar. 27, 2000 (JP) ........................................ 2000-090756
Aug. 21, 2000 (JP) ........................................ 2000-254261

(51) Int. Cl.⁷ .............................................. G02B 15/14
(52) U.S. Cl. ....................................................... 359/692
(58) Field of Search ................................. 359/692, 687, 359/688, 690

(56) References Cited

U.S. PATENT DOCUMENTS 3,346,320 A * 10/1967 Macher ...................... 359/688
3,486,809 A * 12/1969 Macher ...................... 359/688
5,162,947 A    11/1992 Ito
5,353,163 A    10/1994 Shibayama et al.
5,483,380 A     1/1996 Nozawa
5,633,760 A     5/1997 Shibayama
5,900,991 A     5/1999 Kang
6,181,484 B1 *  1/2001 Sato ........................... 359/692

FOREIGN PATENT DOCUMENTS

JP        HEI 11-84236        3/1999

* cited by examiner

Primary Examiner—Scott J. Sugarman
(74) Attorney, Agent, or Firm—Pillsbury Winthrop LLP

(57) ABSTRACT

A wide-angle zoom lens includes a first lens unit with a positive refracting power and a second lens unit with a negative refracting power so that a space between these lens units is changed and thereby the magnification of the zoom lens can be varied. The first lens unit is constructed with a first lens component which is only one negative lens component in the first lens unit, placed at the most object-side position, and at least three positive lens components arranged on the image side of the first lens component to provide air spaces between them. Each of lens components constituting the first lens unit is constructed with a single lens element.

25 Claims, 13 Drawing Sheets

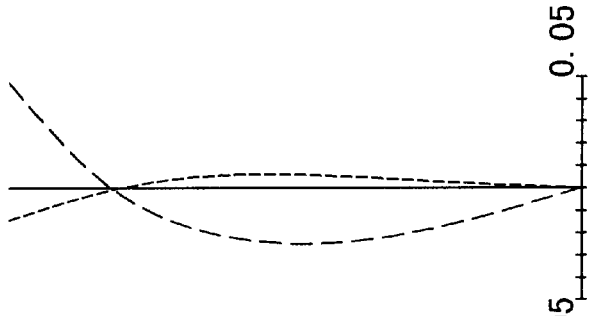
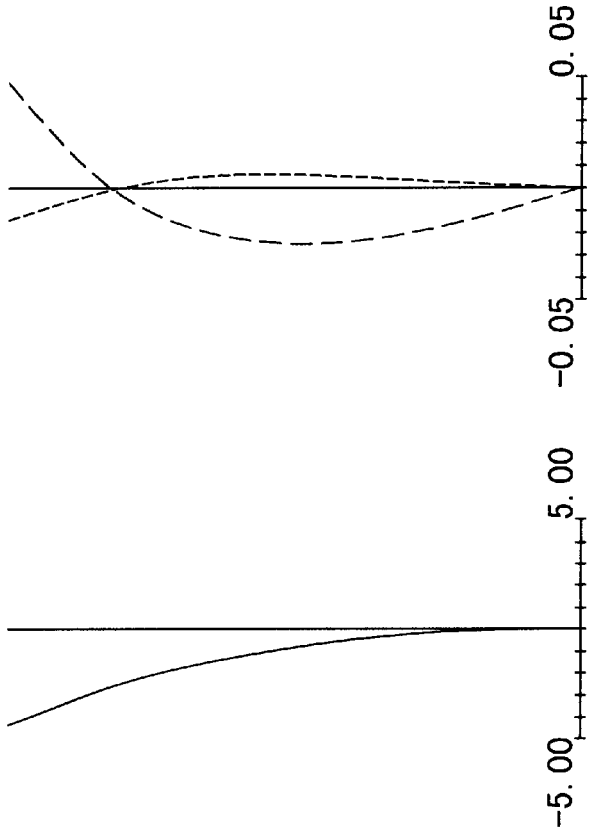
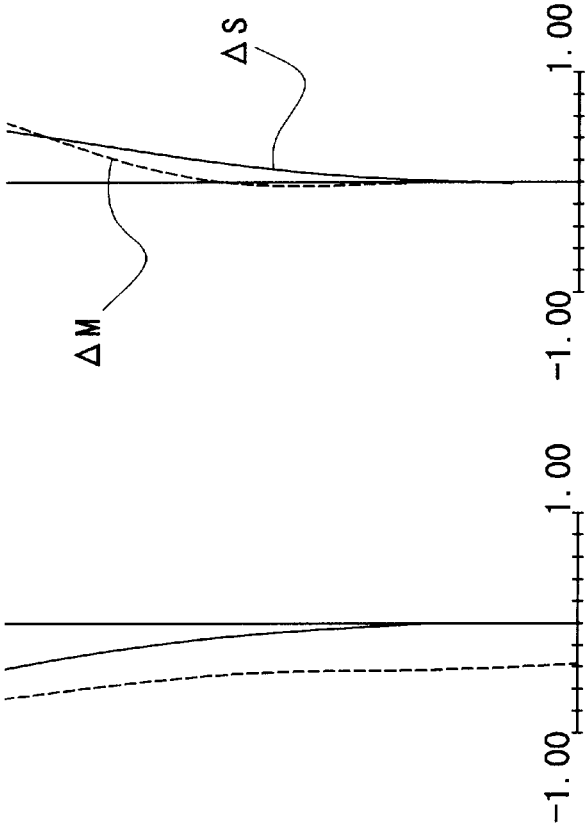

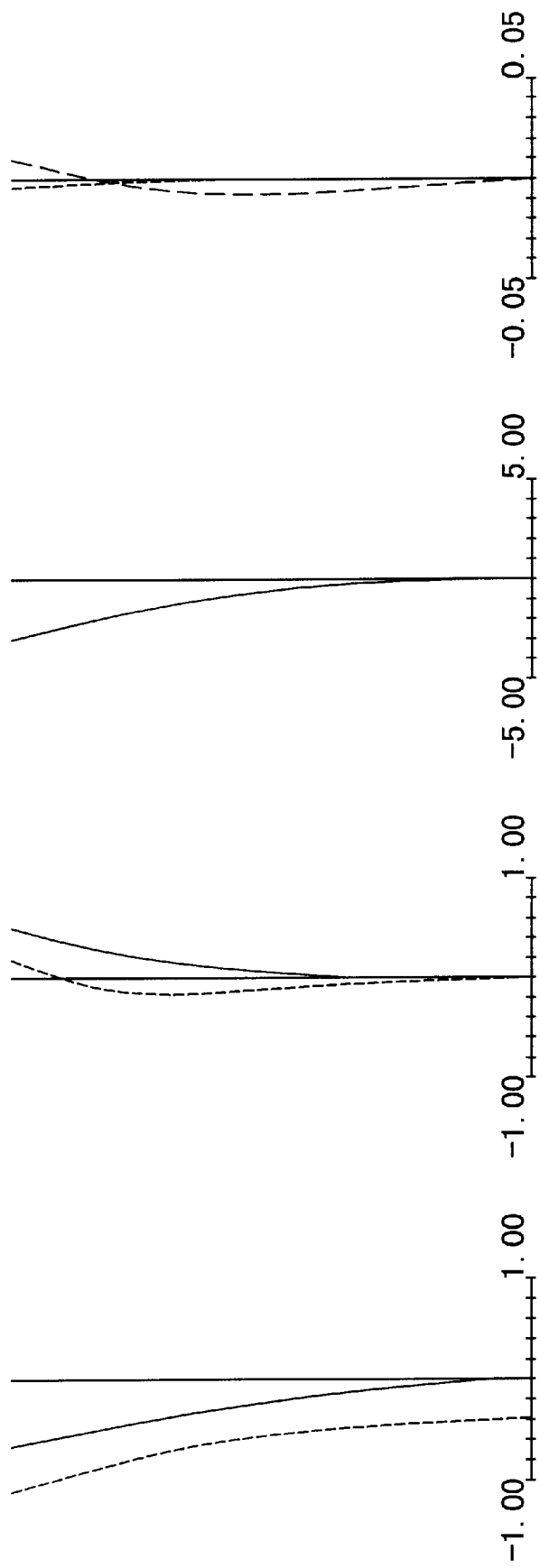

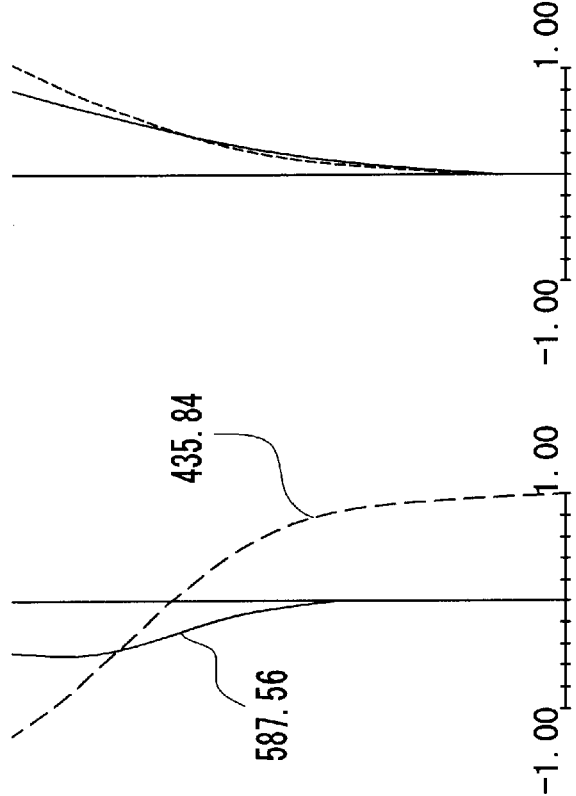

US 6,510,009 B2

WIDE-ANGLE ZOOM LENS AND PHOTOGRAPHING APPARATUS USING THE SAME

BACKGROUND OF THE INVENTION

1. Field of the Invention

This invention relates to a wide-angle zoom lens and a photographing apparatus using this zoom lens.

2. Description of Related Art

A zoom lens constructed with two lens units which have a positive refracting power and a negative refracting power, in this order from the object side, has been widely used because a small number of lens components is required and its arrangement is simple.

Conventional wide-angle zoom lenses of this type, in which the total field angle at a wide-angle position is 70° or more, are known by U.S. Pat. Nos. 5,162,947, 5,353,163, 5,483,380, and 5,633,760.

Since each of these zoom lenses contains a cemented lens element in one lens unit and an independent fabrication process for cementing lenses is required, working time and period required for fabrication are increased accordingly. Furthermore, the zoom lens has a variable-magnification ratio of 2.1 or less and it is difficult to obtain a high magnification. In addition, distortion at the wide-angle position is positive, and thus considerable distortion is produced on the periphery of an image.

A zoom lens of the type that a variable-magnification ratio is 2.5 or more and the cemented lens element is not contained in the lens unit is disclosed in Japanese Patent Preliminary Publication No. Hei 11-84236. However, in order to correct aberration with a small number of lens components, it is necessary to use ED glass which is difficult in workability. Moreover, since a plurality of aspherical surfaces must be used, the zoom lens has the demerit that it is not suitable for mass production.

SUMMARY OF THE INVENTION

It is, therefore, an object of the present invention to provide a wide-angle zoom lens which includes a first lens unit with a positive refracting power and a second lens unit with a negative refracting power, has a total field angle of at least 70° at the wide-angle position and a variable-magnification ratio of 2.5 or more, is constructed with single lens elements, and is simple in arrangement, and a photographing apparatus using this zoom lens.

In order to achieve the above object, the wide-angle zoom lens according to the present invention includes, in order from the object side, the first lens unit with a positive refracting power and the second lens unit with a negative refracting power so that a space between these lens units is changed and thereby the magnification of the zoom lens can be varied. The first lens unit is constructed with a first lens component which is only one negative lens component in the first lens unit, placed at the most object-side position, and at least three positive lens components arranged on the image side of the first lens component to provide air spaces between them. Each of lens components constituting the first lens unit is constructed with a single lens element.

In the wide-angle zoom lens according to the present invention, the first lens unit satisfies the following condition:

$$0.5 < |f1L/f1G| < 1 \tag{1}$$

where f1L is the focal length of the first lens component constructed with a single negative lens component and f1G is the focal length of the first lens unit.

The photographing apparatus using the wide-angle zoom lens according to the present invention employs the wide-angle lens mentioned above as an objective lens.

This and other objects as well as features and advantages of the present invention will become apparent from the following detailed description of the preferred embodiments when taken in conjunction with the accompanying drawings.

BRIEF DESCRIPTION OF THE DRAWINGS

FIGS. 2A, 2B, 2C, and 2D are diagrams showing aberration characteristics at the wide-angle position of the wide-angle zoom lens in the first embodiment;

FIGS. 3A, 3B, 3C, and 3D are diagrams showing aberration characteristics at the middle position of the wide-angle zoom lens in the first embodiment;

FIGS. 4A, 4B, 4C, and 4D are diagrams showing aberration characteristics at the telephoto position of the wide-angle zoom lens in the first embodiment;

DETAILED DESCRIPTION OF THE PREFERRED EMBODIMENTS

Figure 1A:
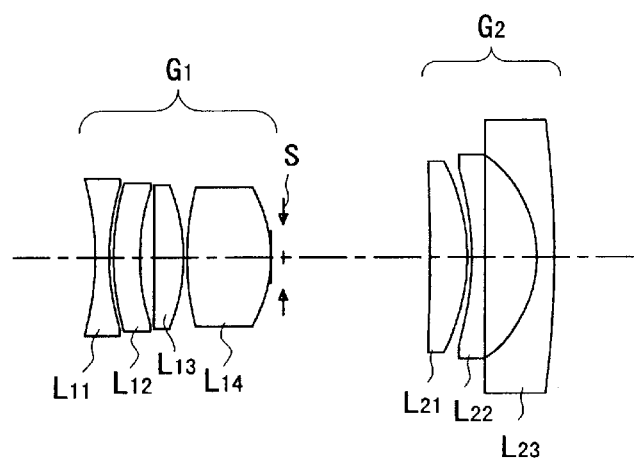
FIGS. 1A and 1B are sectional views showing arrangements, developed along the optical axis, at wide-angle and telephoto positions, respectively, of a first embodiment of the wide-angle zoom lens according to the present invention.

Before undertaking the description of the embodiments, the function and effect of the present invention will be explained below.

When the field angle at the wide-angle position is increased, the effective diameter of the first surface of a lens system has a tendency to increase. According to the present invention, however, when the first lens unit is designed to place a negative lens at the most object-side position thereof and a positive lens on the image side of the negative lens so as to be of a so-called retrofocus type, the increase of the effective diameter is suppressed and at the same time, the amount of ambient light can be ensured. In particular, distortion can be corrected in good balance at the wide-angle position. At the telephoto position, on the other hand, high-order spherical aberration is liable to occur. According to the present invention, however, when at least three positive lenses are arranged to provide air spaces between them, spherical aberration at the telephoto position can be favorably corrected, with a small number of lenses and without using any cemented lens, so that other aberrations are not deteriorated.

According to the present invention, when the first lens unit is constructed so that a negative lens component with a strong negative refracting power is used as the first lens component to satisfy Condition (1), the overall length of the lens system is prevented from increasing and the first lens unit can be arranged as the retrofocus type. Moreover, the increase of the effective diameter is suppressed and at the same time, the amount of ambient light can be ensured.

If the first lens unit is set to be below the lower limit of Condition (1), the amount of yield of aberration of the first lens component will be increased, while beyond the upper limit, the effective diameter of the first lens component will be enlarged.

According to the present invention, it is desirable that the object-side surface of the first lens component of the wide-angle zoom lens is concave.

When the object-side surface of the first lens component, as mentioned above, is configured to be concave, its diameter is minimized and distortion is made negative so that the amount of ambient light can be ensured.

According to the present invention, it is desirable that both surfaces of the first lens component of the wide-angle zoom lens are concave. Thus, when both surfaces of the first lens component are configured as concave surfaces in order to strengthen the negative refracting power of the first lens component, the balance of aberration other than distortion can be held.

In the case where the first lens component of the wide-angle zoom lens is shaped into a meniscus form in which its concave surface is directed toward the object side, it is desirable that the wide-angle zoom lens of the present invention satisfies the following condition:

$$-2<(R1+R2)/(R1-R2)<-1 \qquad (2)$$

where R1 is the radius of curvature of the object-side surface of the first lens component and R2 is the radius of curvature of the image-side surface of the first lens component.

When the first lens component, as mentioned above, is shaped into a meniscus form in which a concave surface is directed toward the object side and satisfies Condition (2), distortion can be favorably corrected. If the first lens component is set to exceed the upper limit of Condition (2), distortion becomes liable to take a negative value. Below the lower limit, on the other hand, fabrication becomes difficult.

As mentioned above, in the wide-angle zoom lens of the present invention, it is possible to choose between techniques that the absolute value of distortion is minimized by the configuration of the first lens component and that distortion on the periphery of the image, caused by perspective, is rendered invisible.

According to the present invention, it is desirable that the wide-angle zoom lens is designed to have a total field angle of 70° or more at the wide-angle position.

In the zoom lens constructed with the two lens units, when the field angle at the wide-angle position is increased, the refracting power of each of the lens units is also increased. However, when a wide-angle zoom lens constructed with at least three lens components is designed so that the field angle at the wide-angle position is increased, the refracting power of each lens component can be suppressed. This is advantageous for a wide-angle design.

According to the present invention, in the wide-angle zoom lens, it is desirable that the first lens unit has at least one aspherical surface whose refracting power changes progressively to take a negative value in going from the optical axis to the periphery thereof, and satisfies the following condition:

$$0.6<(\Phi 0-\Phi 1)\times f\, asp<6.2 \qquad (3)$$

where f asp is the focal length of a lens component with the aspherical surface, $\Phi 0$ is an axial refracting power of the aspherical surface, and $\Phi 1$ is an effective-diameter refracting power of the aspherical surface.

When the first lens unit is constructed as mentioned above, aberration can be favorably corrected with a small number of lens components. If a value relative to the surface configuration of an aspherical lens element is below the lower limit of Condition (3), spherical aberration at the telephoto position is deteriorated. Beyond the upper limit, correction for astigmatism at the wide-angle position becomes difficult.

According to the present invention, in the wide-angle zoom lens, it is favorable that the first lens unit includes a positive lens component made of plastic which has the aspherical surface, and satisfies the following condition:

$$3.5<fp/f1G<15 \qquad (4)$$

where fp is the focal length of the positive plastic lens component and f1G is the focal length of the first lens unit.

When the aspherical surface of the first lens unit, as described above, is configured in the positive plastic lens component, correction for aberration can be made at low cost. When the positive plastic lens component is configured so that the first lens unit satisfies Condition (4), the shift of a focus position caused by a temperature change of the positive plastic lens component itself can be balanced by the shift of a focus position by a temperature change of a lens barrel portion.

If the first lens unit is set to be below the lower limit of Condition (4), the shift of the focus position by the temperature change of the positive plastic lens component itself becomes more considerable than is necessary with respect to the shift of the focus position by the temperature change of the lens barrel portion. Beyond the upper limit, the amount of shift of the focus position by the temperature change of the positive plastic lens component itself becomes much smaller than the amount of shift of the focus position by the temperature change of the lens barrel portion. Alternatively, the focus position of the positive plastic lens component is shifted in the same direction as in the lens barrel portion, and thus the focus position ceases to be set at a proper position.

According to the present invention, in the wide-angle zoom lens, it is favorable that the second lens unit includes, in order from the object side, at least three lens components with positive, negative, and negative refracting powers.

For a zoom lens constructed with two lens units in which the focal length at the wide-angle position is short, there is the need to strengthen the refracting power of each lens unit, and hence considerable aberration is liable to occur. However, as described above, when the refracting power is shared among a plurality of lens components, the amount of yield of aberration is suppressed and at the same time, the refracting power of the lens unit can be increased.

According to the present invention, in the wide-angle zoom lens, it is favorable that the second lens unit includes, in order from the object side, a positive lens component with at least one aspherical surface and a negative lens component.

For the zoom lens constructed with two lens units in which the focal length at the wide-angle position is short, there is the need to strengthen the refracting power of each lens unit, and hence considerable aberration is liable to occur. However, as mentioned above, when an aspherical lens element is disposed in the second lens unit to correct aberration, not only is the deterioration of aberration suppressed, but also the number of lens components is reduced and assembly time can be cut.

According to the present invention, in the wide-angle zoom lens, it is favorable that the second lens unit satisfies the following condition:

$$-0.15 < \Phi p2/\Phi 2G < 0 \qquad (5)$$

where $\Phi p2$ is the refracting power of the positive lens component with the aspherical surface and $\Phi 2G$ is the refracting power of the second lens unit.

When the second lens unit is constructed with a positive lens component and a negative lens component, it is desirable that the positive lens component has a weak refracting power for satisfying Condition (5) in order to maintain a negative refracting power required for the second lens unit and to favorably correct chromatic aberration.

If the refracting power of the positive lens component becomes so strong as to pass the lower limit of Condition (5), the negative refracting power required for the second lens unit will not be obtained, or a negative lens component with a small radius of curvature which is subject to the influence of the error of fabrication must be used in order to maintain the negative refracting power required for the second lens unit. Beyond the upper limit, the shape of the positive lens component is not maintained to change into the shape of a negative lens component. Consequently, correction for chromatic aberration becomes difficult.

According to the present invention, in the wide-angle zoom lens, it is favorable that the second lens unit includes, in order from the object side, at least three lens components with negative, positive, and negative refracting powers.

Thus, when the lens components with negative, positive, and negative refracting powers are arranged in the second lens unit, it is possible to prevent the degradation of imaging performance caused by relative lens decentering in the second lens unit.

According to the present invention, in the wide-angle zoom lens, it is desirable that the second lens unit includes, in order from the object side, at least two positive lens components and at least one negative lens component which have air spaces between them and at least one of surfaces of the two positive lens components is aspherical.

When the second lens unit, as described above, is constructed with the lens components which have positive, positive, and negative refracting powers, the radius of curvature of the object-side surface of the negative lens component can be set to be relatively moderate, and therefore positive distortion can be minimized. When the aspherical lens element is placed in the same lens unit to correct aberrations, astigmatism and coma can be favorably corrected.

According to the present invention, in the wide-angle zoom lens, it is desirable that at least one of positive lens components of the second lens unit is a plastic lens component satisfying the following condition:

$$-0.15 < \Phi pp2/\Phi 2G < 0 \qquad (6)$$

where $\Phi pp2$ is the refracting power of the plastic lens component in the second lens unit.

As mentioned above, when one positive lens component in the second lens unit is made of plastic, the shift of the focus position caused by the temperature rise of the plastic lens component can be balanced by the shift of the focus position by the temperature change of the lens barrel portion. Furthermore, the deterioration of imaging performance caused by lens decentering in the second lens unit can be kept to a minimum.

If the refracting power of the positive plastic lens component is so strong as to pass the lower limit of Condition (6), the negative refracting power required for the second lens unit will not be obtained, or the power of the negative lens component in the second lens unit must be relatively increased in order to maintain the negative refracting power required for the second lens unit. Consequently, the second lens unit is subject to the influence of the error of fabrication and productivity is deteriorated. Beyond the upper limit, the shape of the positive lens component is not maintained to change into the shape of a negative plastic lens component. The result is that the direction of the shift of the focus position caused by the temperature change of the plastic lens itself becomes identical with that of the shift of the focus position by the temperature change of the lens barrel portion, and imaging performance is considerably degraded by a change in ambience.

It is favorable that the photographing apparatus using the wide-angle zoom lens according to the present invention employs the wide-angle zoom lens having been described above as a photographing objective lens.

The embodiments of the present invention will be explained below with reference to the drawings and numerical data.

First Embodiment

Figure 1B:
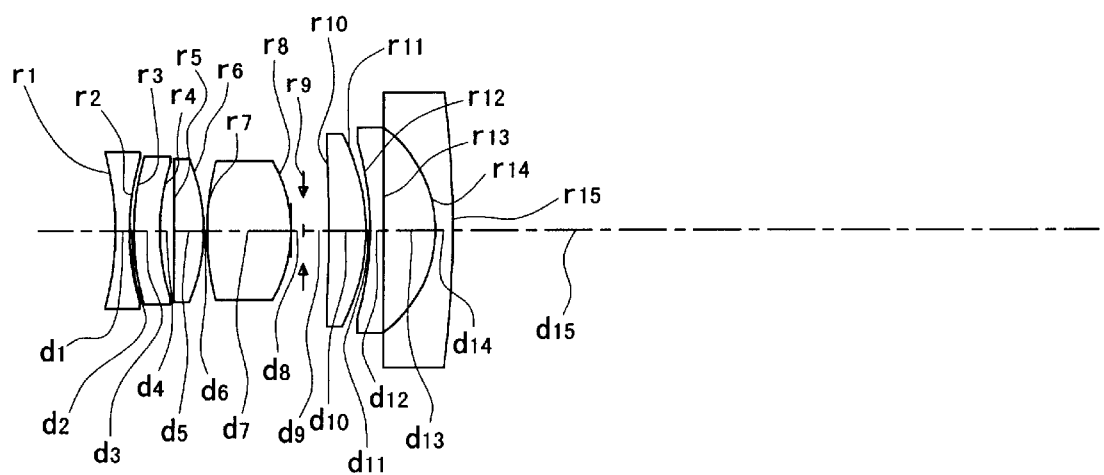

FIGS. 1A and 1B show lens arrangements of the first embodiment of the wide-angle zoom lens according to the present invention. FIGS. 2A–2D, 3A–3D, and 4A–4D show aberration characteristics in the first embodiment.

As shown in FIGS. 1A and 1B, the wide-angle zoom lens of this embodiment includes, in order from the object side, a first lens unit G1 with a positive refracting power and a second lens unit G2 with a negative refracting power so that a space between these two lens units G1 and G2 is changed and thereby the magnification of the zoom lens can be varied. Also, in FIG. 1A, reference symbol S represents a stop.

The first lens unit G1 is constructed with, in order from the object side, a first lens component L11 and three positive lens components L12, L13, and L14. The first lens component L11 is only one negative lens component in the first lens unit G1, and its both surfaces is configured to be concave. The three positive lens components L12, L13, and L14 are arranged to provide air spaces between them.

Each of the lens components L11, L12, L13, and L14 constituting the first lens unit G1 is constructed with a single lens element.

The second lens unit G2 is constructed with, in order from the object side, three lens components L21, L22, and L23 with positive, negative, and negative refracting powers.

The wide-angle zoom lens of the first embodiment, as shown in lens data to be described later, is designed to have a total field angle of 70° or more at the wide-angle position. A variable magnification ratio is more than 2.5.

The first lens unit G1 satisfies Condition (1). Moreover, the first lens unit G1 is designed so that the image-side surface of the positive lens component L12 is configured as an aspherical surface whose refracting power changes progressively to take a negative value in going from the optical axis to the periphery thereof, and satisfies Condition (3). The first lens unit G1 is also designed so that the positive lens component L12 with the aspherical surface is made of plastic, and satisfies Condition (4).

Subsequently, numerical data of optical members constituting the wide-angle zoom lens of the first embodiment are shown. In the numerical data of the first embodiment, $r_1$, $r_2$, ... represent radii of curvature of surfaces of individual lens components; $d_1$, $d_2$, ... represent thicknesses of individual lenses or spaces therebetween; $n_1$, $n_2$, ... represent refractive indices of individual lenses at the d line; $v_1$, $v_2$, ... represent Abbe's numbers of individual lenses; f represents the focal length of the entire wide-angle zoom lens system; ω represents a half field angle; Fno represents an F number; and bf represents a back focal distance.

Also, when z is taken as the coordinate in the direction of the optical axis, y is taken as the coordinate normal to the optical axis, k denotes a conic constant, and $AC_2$, $AC_4$, $AC_6$, and $AC_8$ denote aspherical coefficients, the configuration of each of the aspherical surfaces is expressed by the following equation:

$$z=(y_2/r)/[1+\{1-(1+k)\cdot(y/r)^2\}^{1/2}]+AC_2y^2+AC_4y^4+AC_6y^6+AC_8y^8$$

These symbols hold also for the numerical data of the embodiments to be described later.

Numerical data 1

$r_1 = -22.9330$
$d_1 = 1.3099$      $n_1 = 1.78590$      $v_1 = 44.20$
$r_2 = 27.9037$
$d_2 = 0.6858$
$r_3 = 30.8202$
$d_3 = 2.3000$      $n_3 = 1.52542$      $v_3 = 55.78$
$r_4 = 46.3413$
(aspherical surface)
$d_4 = 1.2565$
$r_5 = 7.2844$
$d_5 = 2.8370$      $n_5 = 1.48749$      $v_5 = 70.23$
$r_6 = -18.8393$
$d_6 = 0.5000$
$r_7 = 61.2786$
$d_7 = 7.6434$      $n_7 = 1.48749$      $v_7 = 70.23$
$r_8 = -12.4990$
$d_8 = 1.0000$
$r_9 = \infty$ (stop surface)
$d_9 = $ (variable)
$r_{10} = -250.5495$ -continued $d_{10} = 3.5567$      $n_{10} = 1.48749$      $v_{10} = 70.23$
$r_{11} = -18.4622$
$d_{11} = 0.3000$
$r_{12} = -39.0092$
$d_{12} = 1.3000$      $n_{12} = 1.71999$      $v_{12} = 50.22$
$r_{13} = 999.9476$
$d_{13} = 4.7475$
$r_{14} = -12.0000$
$d_{14} = 1.8000$      $n_{14} = 1.69680$      $v_{14} = 55.53$
$r_{15} = -95.2658$
$d_{15} = $ bf
Aspherical coefficients
Fourth surface k = 0
$AC_2 = 0$      $AC_4 = 1.9056 \times 10^{-4}$      $AC_6 = 8.5539 \times 10^{-7}$
$AC_8 = 1.0180 \times 10^{-8}$ Zoom data

|  | Wide-angle position | Middle position | Telephoto position |
|---|---|---|---|
| Focal length f | 28.8 | 45.4 | 77.7 |
| d9 | 13.27193 | 6.91897 | 2.33952 |
| bf | 7.22966 | 25.02605 | 59.65779 |
| ω(°) | 38.1 | 26.1 | 15.7 |
| Fno | 5.7 | 8.3 | 10.5 |

Variable magnification ratio: 2.70

Second Embodiment

Figure 5A:
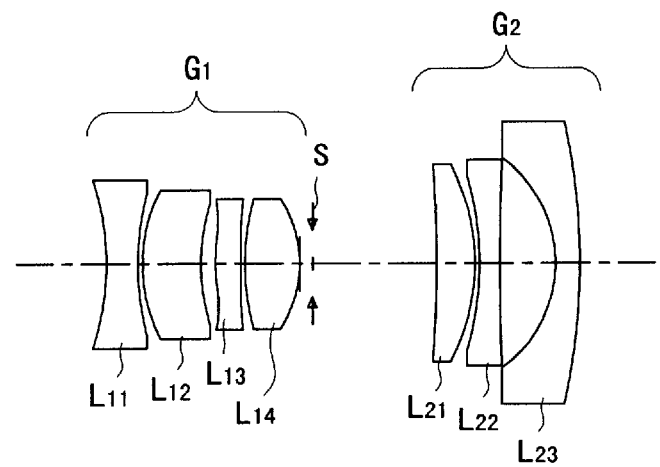
FIGS. 5A and 5B are sectional views showing arrangements, developed along the optical axis, at wide-angle and telephoto positions, respectively, of a second embodiment of the wide-angle zoom lens according to the present invention.
Figure 5B:
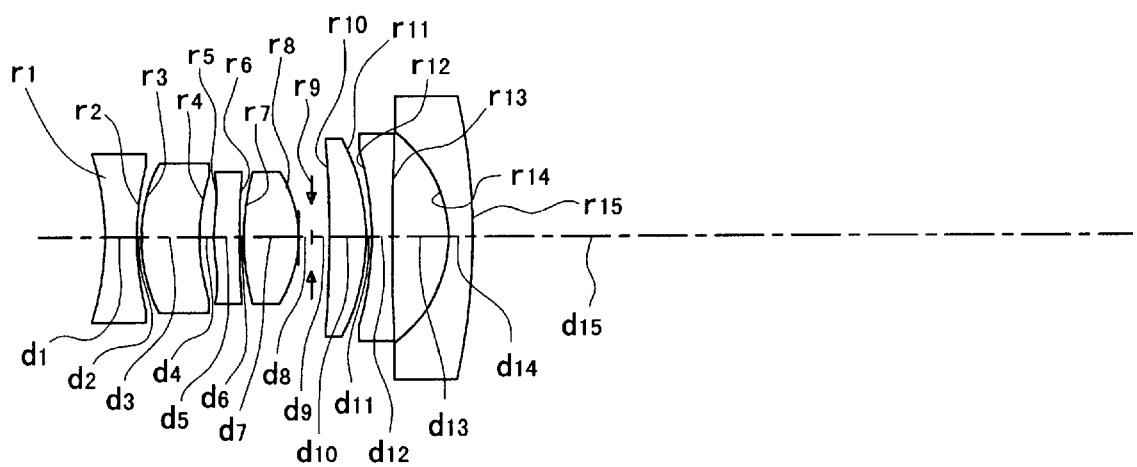

As shown in FIGS. 5A and 5B, the wide-angle zoom lens of this embodiment includes, in order from the object side, the first lens unit G1 with a positive refracting power and the second lens unit G2 with a negative refracting power so that a space between these two lens units G1 and G2 is changed and thereby the magnification of the zoom lens can be varied.

The first lens unit G1 is constructed with, in order from the object side, the first lens component L11 and the three positive lens components L12, L13, and L14. The first lens component L11 is only one negative lens component in the first lens unit G1, and its both surfaces are configured to be concave. The three positive lens components L12, L13, and L14 are arranged to provide air spaces between them.

Each of the lens components L11, L12, L13, and L14 constituting the first lens unit G1 is constructed with a single lens element.

The second lens unit G2 is constructed with, in order from the object side, the three lens components L21, L22, and L23 with positive, negative, and negative refracting powers.

The wide-angle zoom lens of the second embodiment, as shown in lens data to be described later, is designed so that the total field angle at the wide-angle position is larger than 70°. The variable magnification ratio is more than 2.5.

The first lens unit G1 satisfies Condition (1). Moreover, the first lens unit G1 is designed so that the object-side surface of the positive lens component L13 is configured as an aspherical surface whose refracting power changes progressively to take a negative value in going from the optical axis to the periphery thereof, and satisfies Condition (3). The first lens unit G1 is also designed so that the positive lens component L13 with the aspherical surface is made of plastic, and satisfies Condition (4).

Subsequently, numerical data of optical members constituting the wide-angle zoom lens of the second embodiment are shown.

Numerical data 2

$r_1 = -25.6701$
$d_1 = 2.9047$    $n_1 = 1.78590$    $v_1 = 44.20$
$r_2 = 32.1819$
$d_2 = 0.2214$
$r_3 = 15.6248$
$d_3 = 5.0622$    $n_3 = 1.48749$    $v_3 = 70.23$
$r_4 = 24.1810$
$d_4 = 1.0149$
$r_5 = 37.3964$ (aspherical)
$d_5 = 2.3000$    $n_5 = 1.52542$    $v_5 = 55.78$
$r_6 = 57.6770$
$d_6 = 0.4985$
$r_7 = 21.2083$
$d_7 = 5.1775$    $n_7 = 1.48749$    $v_7 = 70.23$
$r_8 = -10.7043$
$d_8 = 1.0000$
$r_9 = \infty$ (stop surface)
$d_9 =$ (variable)
$r_{10} = -187.1820$
$d_{10} = 3.8690$    $n_{10} = 1.53172$    $v_{10} = 48.84$
$r_{11} = -16.6213$
$d_{11} = 0.7000$
$r_{12} = -24.4813$
$d_{12} = 1.3000$    $n_{12} = 1.74400$    $v_{12} = 44.78$
$r_{13} = 300.0000$
$d_{13} = 5.2716$
$r_{14} = -11.7000$
$d_{14} = 1.8000$    $n_{14} = 1.74400$    $v_{14} = 44.78$
$r_{15} = -42.0068$
$d_{15} = bf$
Aspherical coefficients
Fifth surface $k = 0$
$AC_2 = 0$    $AC_4 = -2.9093 \times 10^{-4}$    $AC_6 = -1.3223 \times 10^{-6}$
$AC_8 = -6.5491 \times 10^{-8}$

| | Zoom data | | |
|---|---|---|---|
| | Wide-angle position | Middle position | Telephoto position |
| Focal length f | 28.9 | 67.9 | 93.3 |
| d9 | 12.10599 | 3.28101 | 1.50000 |
| bf | 6.01639 | 44.36650 | 69.35419 |
| ω(°) | 38.2 | 17.9 | 13.2 |
| Fno | 5.8 | 8.5 | 12.6 |

Variable magnification ratio: 3.23

Third Embodiment

Figure 6A:
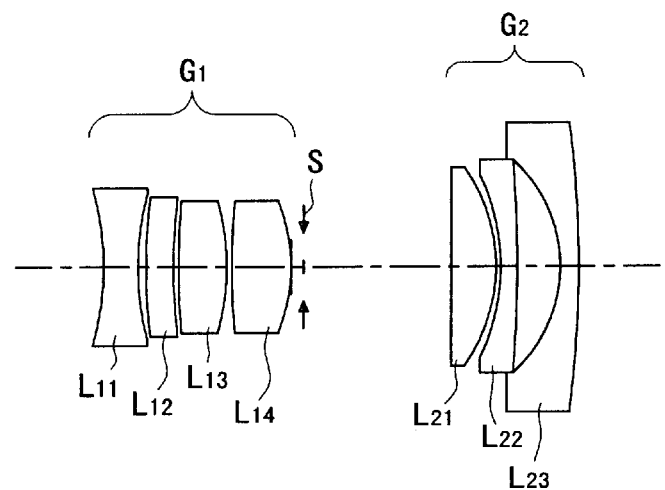
FIGS. 6A and 6B are sectional views showing arrangements, developed along the optical axis, at wide-angle and telephoto positions, respectively, of a third embodiment of the wide-angle zoom lens according to the present invention.
Figure 6B:
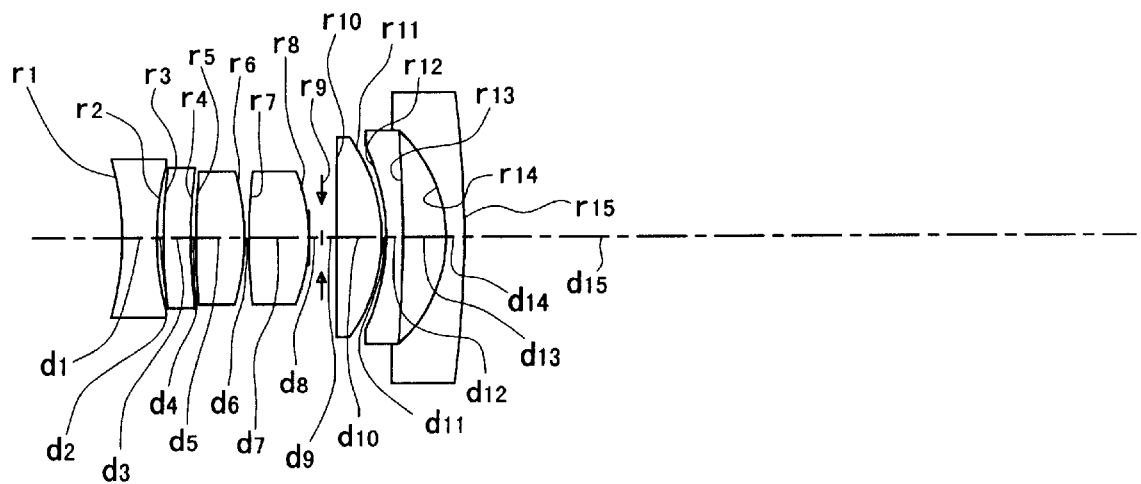

As shown in FIGS. 6A and 6B, the wide-angle zoom lens of this embodiment includes, in order from the object side, the first lens unit G1 with a positive refracting power and the second lens unit G2 with a negative refracting power so that a space between these two lens units G1 and G2 is changed and thereby the magnification of the zoom lens can be varied.

The first lens unit G1 is constructed with, in order from the object side, the first lens component L11 and the three positive lens components L12, L13, and L14. The first lens component L11 is only one negative lens component in the first lens unit G1, and its both surfaces are configured to be concave. The three positive lens components L12, L13, and L14 are arranged to provide air spaces between them.

Each of the lens components L11, L12, L13, and L14 constituting the first lens unit G1 is constructed with a single lens element.

The second lens unit G2 is constructed with, in order from the object side, the three lens components L21, L22, and L23 with positive, negative, and negative refracting powers.

The wide-angle zoom lens of the third embodiment, as shown in lens data to be described later, is designed so that the total field angle at the wide-angle position is larger than 70°. The variable magnification ratio is more than 2.5.

The first lens unit G1 satisfies Condition (1). Moreover, the first lens unit G1 is designed so that the object-side surface of the positive lens component L12 is configured as an aspherical surface whose refracting power changes progressively to take a negative value in going from the optical axis to the periphery thereof, and satisfies Condition (3). The first lens unit G1 is also designed so that the positive lens component L12 with the aspherical surface is made of plastic, and satisfies Condition (4).

Subsequently, numerical data of optical members constituting the wide-angle zoom lens of the third embodiment are shown.

Numerical data 3

$r_1 = -24.5501$
$d_1 = 2.9429$    $n_1 = 1.79952$    $v_1 = 42.22$
$r_2 = 28.6624$
$d_2 = 0.6164$
$r_3 = 24.5193$ (aspherical)
$d_3 = 2.3000$    $n_3 = 1.52542$    $v_3 = 55.78$
$r_4 = 44.4142$
$d_4 = 0.4471$
$r_5 = 68.1178$
$d_5 = 4.3295$    $n_5 = 1.48749$    $v_5 = 70.23$
$r_6 = -21.0738$
$d_6 = 0.3000$
$r_7 = 54.2094$
$d_7 = 5.4283$    $n_7 = 1.48749$    $v_7 = 70.23$
$r_8 = -13.3000$
$d_8 = 1$
$r_9 = \infty$ (stop surface)
$d_9 =$ (variable)
$r_{10} = -228.6806$
$d_{10} = 4.0389$    $n_{10} = 1.48749$    $v_{10} = 70.23$
$r_{11} = -15.6666$
$d_{11} = 0.3000$
$r_{12} = -23.4751$
$d_{12} = 1.1000$    $n_{12} = 1.69680$    $v_{12} = 55.53$
$r_{13} = -104.9397$
$d_{13} = 4.1325$
$r_{14} = -12.0000$
$d_{14} = 1.8000$    $n_{14} = 1.69680$    $v_{14} = 55.53$
$r_{15} = -97.7837$
$d_{15} = bf$
Aspherical coefficients
Third surface $k = 0$
$AC_2 = 0$    $AC_4 = -1.8091 \times 10^{-4}$    $AC_6 = -1.4262 \times 10^{-6}$
$AC_8 = -6.2784 \times 10^{-9}$

| | Zoom data | | |
|---|---|---|---|
| | Wide-angle position | Middle position | Telephoto position |
| Focal length f | 28.9 | 45.7 | 89.1 |
| d9 | 13.20496 | 6.77787 | 1.40000 |
| bf | 7.18081 | 25.25387 | 71.87850 |
| ω(°) | 38.1 | 26.0 | 13.8 |
| Fno | 5.7 | 8.5 | 11.7 |

Variable magnification ratio: 3.08

Fourth Embodiment

Figure 7A:
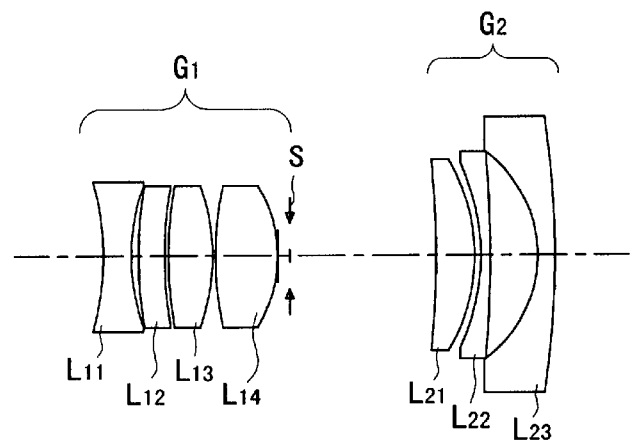
FIGS. 7A and 7B are sectional views showing arrangements, developed along the optical axis, at wide-angle and telephoto positions, respectively, of a fourth embodiment of the wide-angle zoom lens according to the present invention.
Figure 7B:
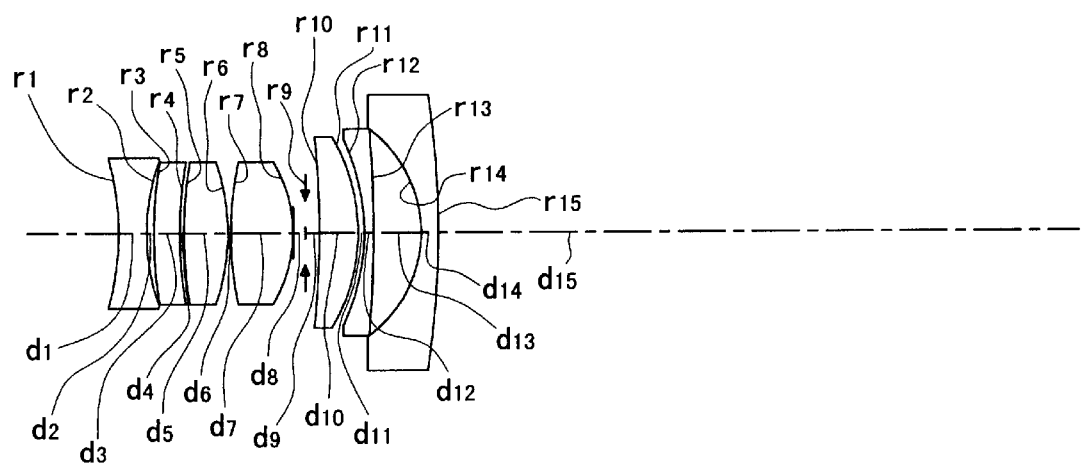

As shown in FIGS. 7A and 7B, the wide-angle zoom lens of this embodiment includes, in order from the object side, the first lens unit G1 with a positive refracting power and the second lens unit G2 with a negative refracting power so that a space between these two lens units G1 and G2 is changed and thereby the magnification of the zoom lens can be varied.

The first lens unit G1 is constructed with, in order from the object side, the first lens component L11 and the three positive lens components L12, L13, and L14. The first lens component L11 is only one negative lens component in the first lens unit G1, and its both surfaces are configured to be concave. The three positive lens components L12, L13, and L14 are arranged to provide air spaces between them.

Each of the lens components L11, L12, L13, and L14 constituting the first lens unit G1 is constructed with a single lens element.

The second lens unit G2 is constructed with, in order from the object side, the three lens components L21, L22, and L23 with positive, negative, and negative refracting powers.

The wide-angle zoom lens of the fourth embodiment, as shown in lens data to be described later, is designed so that the total field angle at the wide-angle position is larger than 70°. The variable magnification ratio is more than 2.5.

The first lens unit G1 satisfies Condition (1). Moreover, the first lens unit G1 is designed so that the object-side surface of the positive lens component L12 is configured as an aspherical surface whose refracting power changes progressively to take a negative value in going from the optical axis to the periphery thereof, and satisfies Condition (3). The first lens unit G1 is also designed so that the positive lens component L12 with the aspherical surface is made of plastic, and satisfies Condition (4).

Subsequently, numerical data of optical members constituting the wide-angle zoom lens of the fourth embodiment are shown.

Numerical data 4

$r_1 = -24.2912$
$d_1 = 2.9256$  $n_1 = 1.79952$  $v_1 = 42.22$
$r_2 = 32.1548$
$d_2 = 0.6573$
$r_3 = 25.5343$ (aspherical)
$d_3 = 2.3000$  $n_3 = 1.52542$  $v_3 = 55.78$
$r_4 = 29.5368$
$d_4 = 0.4101$
$r_5 = 39.4901$
$d_5 = 4.4116$  $n_5 = 1.48749$  $v_5 = 70.23$
$r_6 = -21.7824$
$d_6 = 0.3000$
$r_7 = 53.9751$
$d_7 = 5.3218$  $n_7 = 1.48749$  $v_7 = 70.23$
$r_8 = -13.3000$
$d_8 = 1$
$r_9 = \infty$ (stop surface)
$d_9$ = (variable)
$r_{10} = 227.8759$
$d_{10} = 4.0397$  $n_{10} = 1.48749$  $v_{10} = 70.23$
$r_{11} = -15.7077$
$d_{11} = 0.3000$
$r_{12} = -23.5930$
$d_{12} = 1.1000$  $n_{12} = 1.69680$  $v_{12} = 55.53$
$r_{13} = 110.2801$
$d_{13} = 4.1298$
$r_{14} = -12.0000$
$d_{14} = 1.8000$  $n_{14} = 1.69680$  $v_{14} = 55.53$
$r_{15} = -95.5993$
$d_{15}$ = bf
Aspherical coefficients -continued Third surface $k = 0$
$AC_2 = 0$  $AC_4 = -1.7665 \times 10^{-4}$  $AC_6 = -1.3885 \times 10^{-6}$
$AC_8 = -6.1087 \times 10^{-9}$ Zoom data

|  | Wide-angle position | Middle position | Telephoto position |
|---|---|---|---|
| Focal length f | 28.9 | 46.0 | 78.3 |
| d9 | 13.16675 | 6.70712 | 2.19181 |
| bf | 7.13661 | 25.41474 | 60.00558 |
| ω(°) | 38.1 | 25.8 | 15.6 |
| Fno | 5.7 | 8.5 | 10.3 |

Variable magnification ratio: 2.71

Fifth Embodiment

Figure 8A:
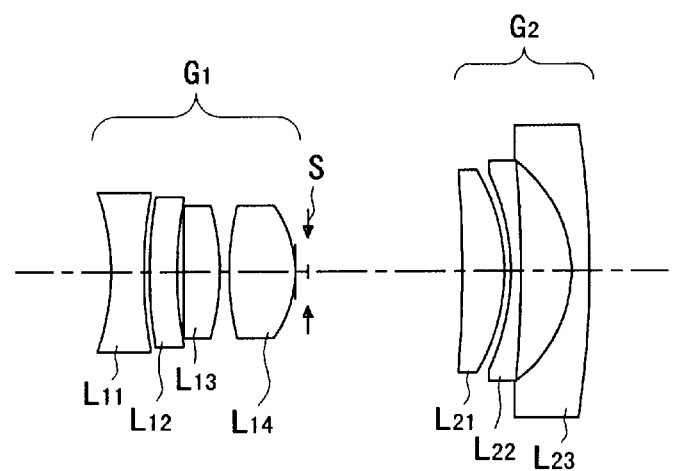
FIGS. 8A and 8B are sectional views showing arrangements, developed along the optical axis, at wide-angle and telephoto positions, respectively, of a fifth embodiment of the wide-angle zoom lens according to the present invention.
Figure 8B:
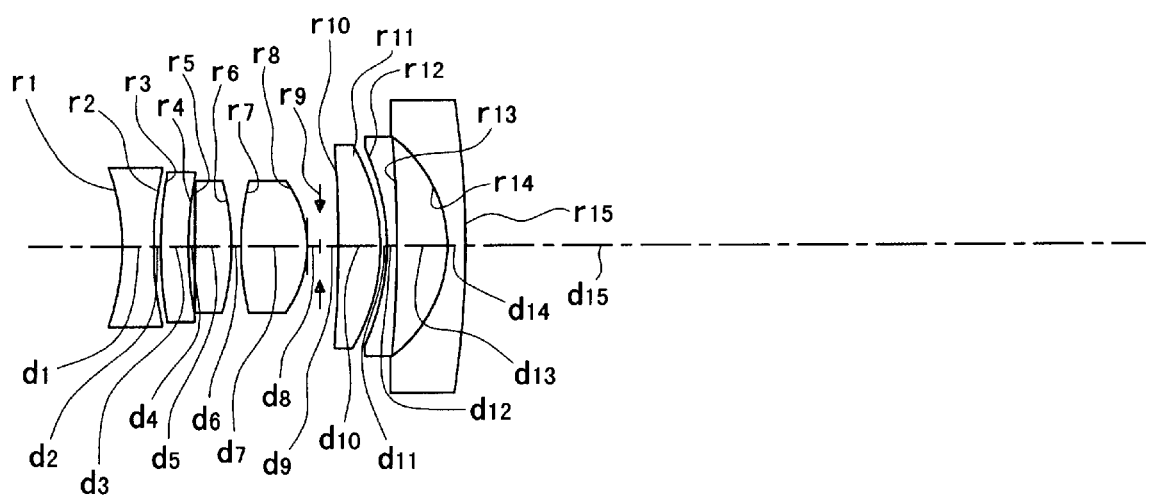

As shown in FIGS. 8A and 8B, the wide-angle zoom lens of this embodiment includes, in order from the object side, the first lens unit G1 with a positive refracting power and the second lens unit G2 with a negative refracting power so that a space between these two lens units G1 and G2 is changed and thereby the magnification of the zoom lens can be varied.

The first lens unit G1 is constructed with, in order from the object side, the first lens component L11 and the three positive lens components L12, L13, and L14. The first lens component L11 is only one negative lens component in the first lens unit G1, and its both surfaces are configured to be concave. The three positive lens components L12, L13, and L14 are arranged to provide air spaces between them.

Each of the lens components L11, L12, L13, and L14 constituting the first lens unit G1 is constructed with a single lens element.

The second lens unit G2 is constructed with, in order from the object side, the three lens components L21, L22, and L23 with positive, negative, and negative refracting powers.

The wide-angle zoom lens of the fifth embodiment, as shown in lens data to be described later, is designed so that the total field angle at the wide-angle position is larger than 70°. The variable magnification ratio is more than 2.5.

The first lens unit G1 satisfies Condition (1). Moreover, the first lens unit G1 is designed so that the object-side surface of the positive lens component L12 is configured as an aspherical surface whose refracting power changes progressively to take a negative value in going from the optical axis to the periphery thereof, and satisfies Condition (3). The first lens unit G1 is also designed so that the positive lens component L12 with the aspherical surface is made of plastic, and satisfies Condition (4).

Subsequently, numerical data of optical members constituting the wide-angle zoom lens of the fifth embodiment are shown.

Numerical data 5

$r_1 = -24.4210$
$d_1 = 2.9800$  $n_1 = 1.80440$  $v_1 = 39.59$
$r_2 = 51.1635$
$d_2 = 0.4496$
$r_3 = 29.2635$ (aspherical)
$d_3 = 2.3000$  $n_3 = 1.52542$  $v_3 = 55.78$
$r_4 = 35.0592$
$d_4 = 0.6098$
$r_5 = 355.3994$
$d_5 = 2.7887$  $n_5 = 1.51633$  $v_5 = 64.14$
$r_6 = -22.3932$
$d_6 = 1.3343$ -continued $r_7 = 49.3034$
$d_7 = 5.1349$    $n_7 = 1.51633$    $v_7 = 64.14$
$r_8 = -13.1547$
$d_8 = 1.0000$
$r_9 = \infty$ (stop surface)
$d_9 =$ (variable)
$r_{10} = -259.5757$
$d_{10} = 4.0024$    $n_{10} = 1.48749$    $v_{10} = 70.23$
$r_{11} = -15.4972$
$d_{11} = 0.3000$
$r_{12} = -22.3595$
$d_{12} = 1.1000$    $n_{12} = 1.69680$    $v_{12} = 55.53$
$r_{13} = -124.0111$
$d_{13} = 3.9989$
$r_{14} = -12.1530$
$d_{14} = 1.8000$    $n_{14} = 1.69680$    $v_{14} = 55.53$
$r_{15} = -88.8217$
$d_{15} = bf$
Aspherical coefficients
Third surface $k = 0$
$AC_2 = 0$    $AC_4 = -1.7665 \times 10^{-4}$    $AC_6 = -1.3885 \times 10^{-6}$
$AC_8 = -6.1087 \times 10^{-9}$ Zoom data

|  | Wide-angle position | Middle position | Telephoto position |
|---|---|---|---|
| Focal length f | 29.0 | 50.2 | 89.1 |
| d9 | 12.77550 | 5.54481 | 1.23674 |
| bf | 6.89190 | 29.26964 | 70.27398 |
| ω(°) | 38.1 | 23.8 | 13.8 |
| Fno | 5.8 | 8.4 | 11.5 |

Variable magnification ratio: 3.07

Sixth Embodiment

Figure 9A:
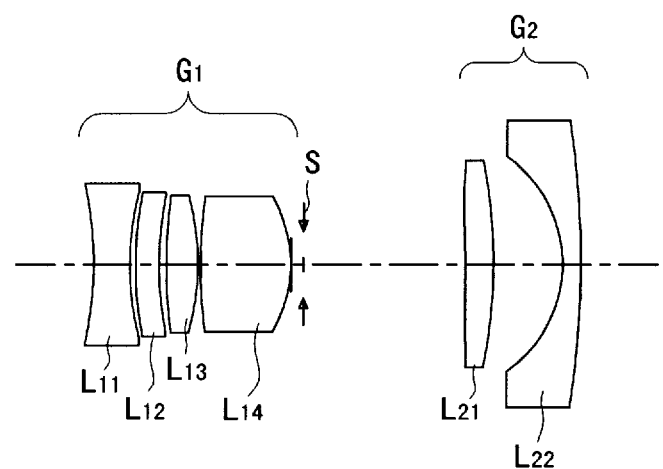
FIGS. 9A and 9B are sectional views showing arrangements, developed along the optical axis, at wide-angle and telephoto positions, respectively, of a sixth embodiment of the wide-angle zoom lens according to the present invention.
Figure 9B:
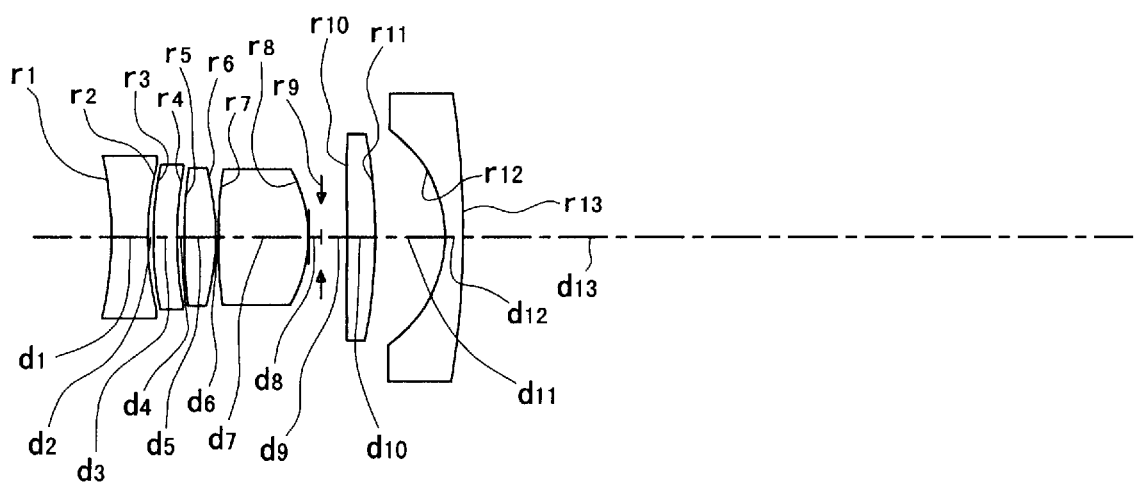

As shown in FIGS. 9A and 9B, the wide-angle zoom lens of this embodiment includes, in order from the object side, the first lens unit G1 with a positive refracting power and the second lens unit G2 with a negative refracting power so that a space between these two lens units G1 and G2 is changed and thereby the magnification of the zoom lens can be varied.

The first lens unit G1 is constructed with, in order from the object side, the first lens component L11 and the three positive lens components L12, L13, and L14. The first lens component L11 is only one negative lens component in the first lens unit G1, and its both surfaces are configured to be concave. The three positive lens components L12, L13, and L14 are arranged to provide air spaces between them.

Each of the lens components L11, L12, L13, and L14 constituting the first lens unit G1 is constructed with a single lens element.

The second lens unit G2 is constructed with, in order from the object side, a positive lens component L21 and a negative lens component L22.

The wide-angle zoom lens of the sixth embodiment, as shown in lens data to be described later, is designed so that the total field angle at the wide-angle position is larger than 70°. The variable magnification ratio is more than 2.5.

The first lens unit G1 satisfies Condition (1). Moreover, the first lens unit G1 is designed so that the image-side surface of the positive lens component L12 is configured as an aspherical surface whose refracting power changes progressively to take a negative value in going from the optical axis to the periphery thereof, and satisfies Condition (3). The first lens unit G1 is also designed so that the positive lens component L12 with the aspherical surface is made of plastic, and satisfies Condition (4).

The second lens unit G2 is designed so that the object-side surface of the positive lens component L21 is configured as an aspherical surface, and satisfies Condition (5).

Subsequently, numerical data of optical members constituting the wide-angle zoom lens of the sixth embodiment are shown.

Numerical data 6

$r_1 = -24.8564$
$d_1 = 3.1663$    $n_1 = 1.79952$    $v_1 = 42.22$
$r_2 = 25.7838$
$d_2 = 0.2463$
$r_3 = 27.6541$
$d_3 = 2.1289$    $n_3 = 1.52542$    $v_3 = 55.78$
$r_4 = 40.1702$ (aspherical)
$d_4 = 0.4329$
$r_5 = 31.0049$
$d_5 = 2.9066$    $n_5 = 1.51633$    $v_5 = 64.14$
$r_6 = -25.7932$
$d_6 = 0.2892$
$r_7 = 55.4266$
$d_7 = 7.5628$    $n_7 = 1.48749$    $v_7 = 70.23$
$r_8 = -12.1423$
$d_8 = 1.0000$
$r_9 = \infty$ (stop surface)
$d_9 =$ (variable)
$r_{10} = -40.6204$
(aspherical)
$d_{10} = 2.9057$    $n_{10} = 1.52542$    $v_{10} = 55.78$
$r_{11} = -28.0454$
$d_{11} = 6.1190$
$r_{12} = -10.2107$
$d_{12} = 1.8000$    $n_{12} = 1.74320$    $v_{12} = 49.34$
$r_{13} = -37.8850$
$d_{13} = bf$
Aspherical coefficients
Fourth surface $k = 0$
$AC_2 = 0$    $AC_4 = 1.9080 \times 10^{-4}$    $AC_6 = 6.4615 \times 10^{-7}$
$AC_8 = 1.7481 \times 10^{-8}$
Tenth surface $k = 0$
$AC_2 = 0$    $AC_4 = 5.7705 \times 10^{-5}$    $AC_6 = 2.3098 \times 10^{-7}$
$AC_8 = 4.1942 \times 10^{-9}$ Zoom data

|  | Wide-angle position | Middle position | Telephoto position |
|---|---|---|---|
| Focal length f | 29.0 | 41.8 | 77.4 |
| d9 | 12.77941 | 7.69942 | 2.41129 |
| bf | 6.48185 | 19.72581 | 56.52462 |
| ω(°) | 37.9 | 28.0 | 15.8 |
| Fno | 5.7 | 7.6 | 10.2 |

Variable magnification ratio: 2.67

Seventh Embodiment

Figure 10A:
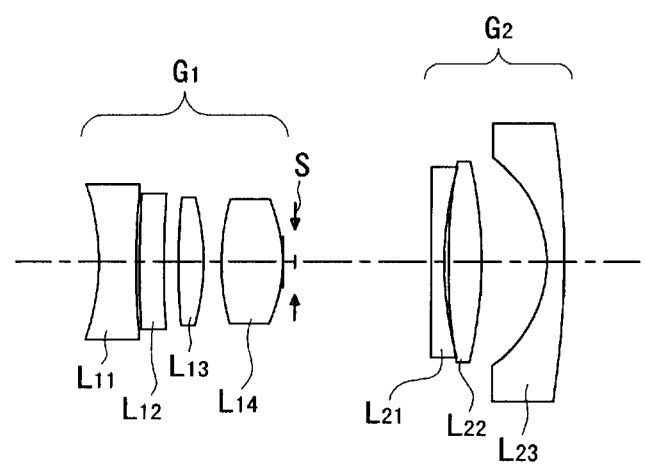
FIGS. 10A and 10B are sectional views showing arrangements, developed along the optical axis, at wide-angle and telephoto positions, respectively, of a seventh embodiment of the wide-angle zoom lens according to the present invention.
Figure 10B:
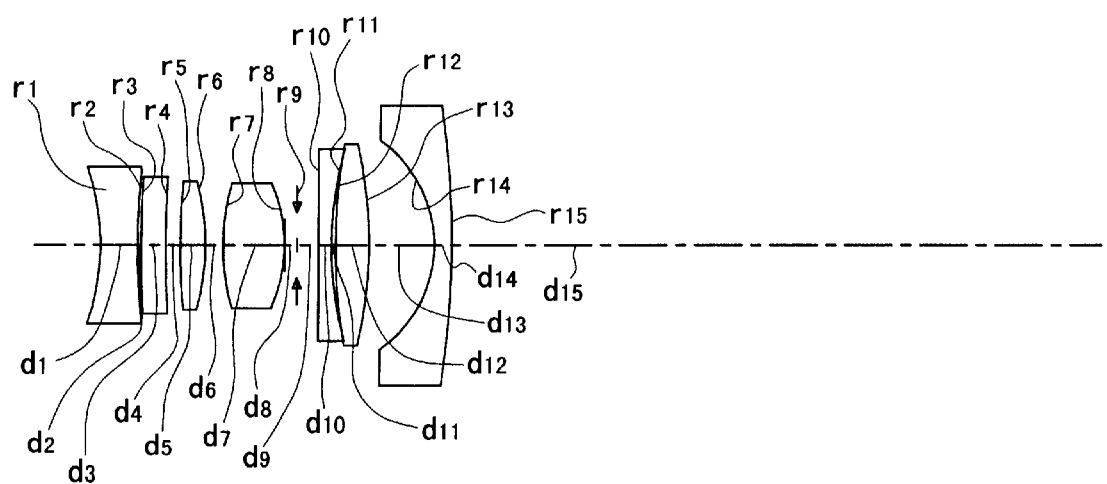

As shown in FIGS. 10A and 10B, the wide-angle zoom lens of this embodiment includes, in order from the object side, the first lens unit G1 with a positive refracting power and the second lens unit G2 with a negative refracting power so that a space between these two lens units G1 and G2 is changed and thereby the magnification of the zoom lens can be varied.

The first lens unit G1 is constructed with, in order from the object side, the first lens component L11 and the three positive lens components L12, L13, and L14. The first lens component L11 is only one negative lens component in the first lens unit g1, and its both surfaces are configured to be concave. The three positive lens components L12, L13, and L14 are arranged to provide air spaces between them.

Each of the lens components L11, L12, L13, and L14 constituting the first lens unit G1 is constructed with a single lens element.

The second lens unit G2 is constructed with, in order from the object side, the three lens components L21, L22, and L23 with negative, positive, and negative refracting powers.

The wide-angle zoom lens of the seventh embodiment, as shown in lens data to be described later, is designed so that the total field angle at the wide-angle position is larger than 70°. The variable magnification ratio is more than 2.5.

The first lens unit G1 satisfies Condition (1). Moreover, the first lens unit G1 is designed so that the image-side surface of the positive lens component L12 is configured as an aspherical surface whose refracting power changes progressively to take a negative value in going from the optical axis to the periphery thereof, and satisfies Condition (3). The first lens unit G1 is also designed so that the positive lens component L12 with the aspherical surface is made of plastic, and satisfies Condition (4).

Subsequently, numerical data of optical members constituting the wide-angle zoom lens of the seventh embodiment are shown.

Numerical data 7

$r_1 = -17.1295$
$d_1 = 3.3221$   $n_1 = 1.80440$   $v_1 = 39.59$
$r_2 = 92.5269$
$d_2 = 0.3838$
$r_3 = 139.1984$
$d_3 = 2.3000$   $n_3 = 1.52542$   $v_3 = 55.78$
$r_4 = -269.2381$ (aspherical)
$d_4 = 0.7424$
$r_5 = 64.5219$
$d_5 = 2.2918$   $n_5 = 1.48749$   $v_5 = 70.23$
$r_6 = -25.9828$
$d_6 = 1.0228$
$r_7 = 29.1531$
$d_7 = 5.3882$   $n_7 = 1.51633$   $v_7 = 64.14$
$r_8 = -16.1758$
$d_8 = 1.0000$
$r_9 = \infty$ (stop surface)
$d_9 =$ (variable)
$r_{10} = 498.4803$
$d_{10} = 1.3000$   $n_{10} = 1.71999$   $v_{10} = 50.22$
$r_{11} = 33.0024$
$d_{11} = 0.5000$
$r_{12} = 58.3860$
$d_{12} = 3.0384$   $n_{12} = 1.51742$   $v_{12} = 52.43$
$r_{13} = -43.6164$
$d_{13} = 4.7739$
$r_{14} = -13.7242$
$d_{14} = 1.8000$   $n_{14} = 1.71999$   $v_{14} = 50.22$
$r_{15} = -82.1496$
$d_{15} = bf$
Aspherical coefficients
Fourth surface $k = 0$
$AC_2 = 0$   $AC_4 = 9.7729 \times 10^{-4}$   $AC_6 = -4.1226 \times 10^{-8}$
$AC_8 = 1.0008 \times 10^{-8}$

| Zoom data | | | |
|---|---|---|---|
| | Wide-angle position | Middle position | Telephoto position |
| Focal length f | 29.0 | 48.0 | 83.2 |
| d9 | 12.91281 | 6.28188 | 2.01974 |
| bf | 6.28188 | 27.36545 | 65.64564 |

-continued

| | | | |
|---|---|---|---|
| ω(°) | 37.5 | 24.8 | 14.7 |
| Fno | 5.7 | 8.3 | 10.6 |

Variable magnification ratio: 2.87

Eighth Embodiment

Figure 11A:
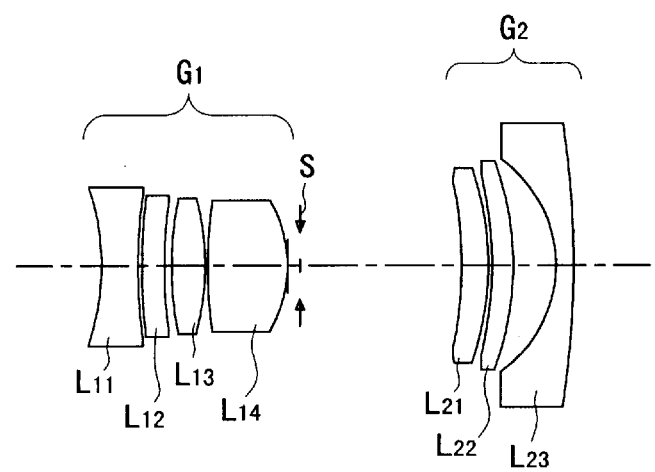
FIGS. 11A and 11B are sectional views showing arrangements, developed along the optical axis, at wide-angle and telephoto positions, respectively, of an eighth embodiment of the wide-angle zoom lens according to the present invention.
Figure 11B:
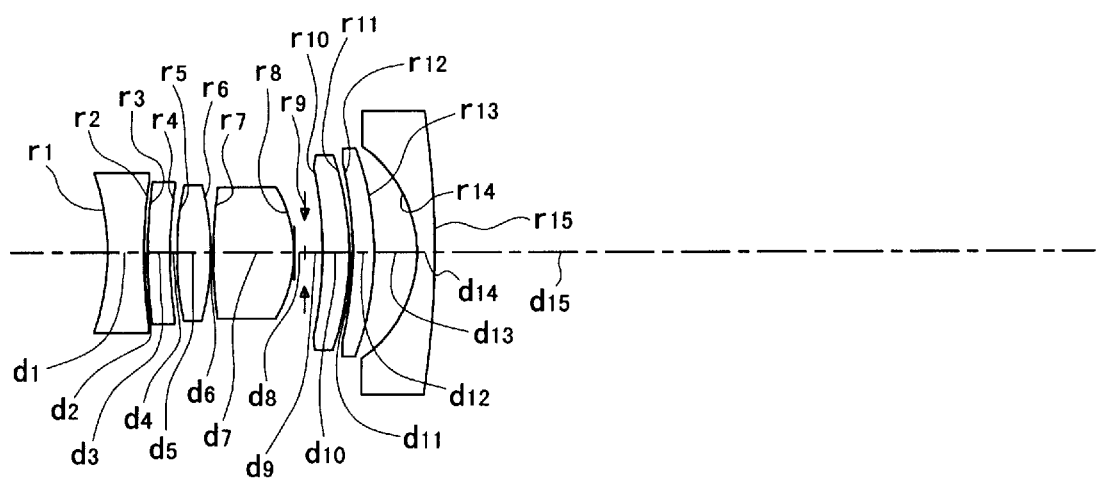

As shown in FIGS. 11A and 11B, the wide-angle zoom lens of this embodiment includes, in order from the object side, the first lens unit G1 with a positive refracting power and the second lens unit G2 with a negative refracting power so that a space between these two lens units G1 and G2 is changed and thereby the magnification of the zoom lens can be varied.

The first lens unit G1 is constructed with, in order from the object side, the first lens component L11 and the three positive lens components L12, L13, and L14. The first lens component L11 is only one negative lens component in the first lens unit G1, and its both surfaces are configured to be concave. The three positive lens components L12, L13, and L14 are arranged to provide air spaces between them.

Each of the lens components L11, L12, L13, and L14 constituting the first lens unit G1 is constructed with a single lens element.

The second lens unit G2 is constructed with, in order from the object side, the three lens components L21, L22, and L23 with positive, positive, and negative refracting powers, arranged to provide air spaces between them.

The wide-angle zoom lens of the eighth embodiment, as shown in lens data to be described later, is designed so that the total field angle at the wide-angle position is larger than 70°. The variable magnification ratio is more than 2.5.

The first lens unit G1 satisfies Condition (1). Moreover, the first lens unit G1 is designed so that the image-side surface of the positive lens component L12 is configured as an aspherical surface whose refracting power changes progressively to take a negative value in going from the optical axis to the periphery thereof, and satisfies Condition (3). The first lens unit G1 is also designed so that the positive lens component L12 with the aspherical surface is made of plastic, and satisfies Condition (4).

The second lens unit G2 is designed so that the object-side surface of the positive lens component L21 is configured as an aspherical surface and the positive lens components L21 with the aspherical surface is made of plastic, satisfying Condition (6).

Subsequently, numerical data of optical members constituting the wide-angle zoom lens of the eighth embodiment are shown.

Numerical data 8

$r_1 = -25.6473$
$d_1 = 2.8579$   $n_1 = 1.79952$   $v_1 = 42.22$
$r_2 = 25.6473$
$d_2 = 0.4174$
$r_3 = 29.8690$
$d_3 = 2.0562$   $n_3 = 1.52542$   $v_3 = 55.78$
$r_4 = 45.3902$ (aspherical)
$d_4 = 0.8598$
$r_5 = 43.9457$
$d_5 = 2.8234$   $n_5 = 1.51633$   $v_5 = 64.14$
$r_6 = -23.1161$
$d_6 = 0.2672$
$r_7 = 72.8705$
$d_7 = 8.0385$   $n_7 = 1.48749$   $v_7 = 70.23$
$r_8 = -12.1656$
$d_8 = 1.0000$
$r_9 = \infty$ (stop surface)

-continued $d_9$ = (variable)
$r_{10}$ = −90.2176
(aspherical)
$d_{10}$ = 2.7488      $n_{10}$ = 1.52542      $v_{10}$ = 55.78
$r_{11}$ = −46.7282
$d_{11}$ = 0.4711
$r_{12}$ = −39.7938
$d_{12}$ = 1.8597      $n_{12}$ = 1.48749      $v_{12}$ = 70.23
$r_{13}$ = −24.7956
$d_{13}$ = 4.1137
$r_{14}$ = −11.5049
$d_{14}$ = 1.8000      $n_{14}$ = 1.74320      $v_{14}$ = 49.34
$r_{15}$ = −109.9862
$d_{15}$ = bf
Aspherical coefficients
Fourth surface k = 0
$AC_2$ = 0               $AC_4$ = 1.9219 × 10$^{-4}$     $AC_6$ = 4.5858 × 10$^{-7}$
$AC_8$ = 2.0579 × 10$^{-8}$
Tenth surface k = 0
$AC_2$ = 0               $AC_4$ = 4.5090 × 10$^{-5}$     $AC_6$ = −6.2618 × 10$^{-8}$
$AC_8$ = 3.1309 × 10$^{-9}$ Zoom data

|  | Wide-angle position | Middle position | Telephoto position |
|---|---|---|---|
| Focal length f | 29.0 | 49.1 | 85.7 |
| d9 | 13.89944 | 6.48384 | 1.93303 |
| bf | 7.11678 | 28.78177 | 68.10913 |
| ω(°) | 37.7 | 24.2 | 14.3 |
| Fno | 5.7 | 7.7 | 11.3 |

Variable magnification ratio: 2.96

Ninth Embodiment

Figure 12A:
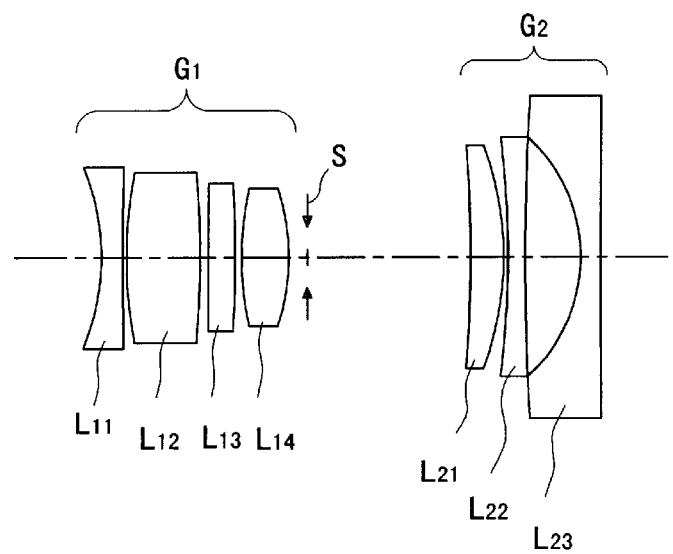
FIGS. 12A and 12B are sectional views showing arrangements, developed along the optical axis, at wide-angle and telephoto positions, respectively, of a ninth embodiment of the wide-angle zoom lens according to the present invention.
Figure 12B:
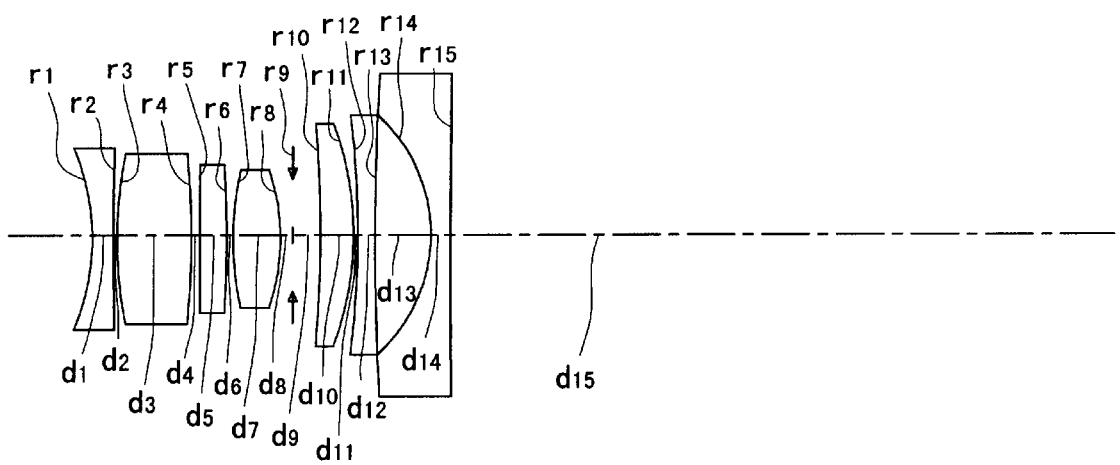

As shown in FIGS. 12A and 12B, the wide-angle zoom lens of this embodiment includes, in order from the object side, the first lens unit G1 with a positive refracting power and the second lens unit G2 with a negative refracting power so that a space between these two lens units G1 and G2 is changed and thereby the magnification of the zoom lens can be varied.

The first lens unit G1 is constructed with, in order from the object side, the first lens component L11 and the three positive lens components L12, L13, and L14. The first lens component L11 is only one negative lens component in the first lens unit G1, and is shaped into a meniscus form in which its concave surface is directed toward the object side. The three positive lens components L12, L13, and L14 are arranged to provide air spaces between them.

Each of the lens components L11, L12, L13, and L14 constituting the first lens unit G1 is constructed with a single lens element.

The second lens unit G2 is constructed with, in order from the object side, the three lens components L21, L22, and L23 with positive, negative, and negative refracting powers.

The wide-angle zoom lens of the ninth embodiment, as shown in lens data to be described later, is designed so that the total field angle at the wide-angle position is larger than 70°. The variable magnification ratio is more than 2.5.

The first lens unit G1 satisfies Condition (1). The first lens component L11 of the first lens unit G1 satisfies Condition (2). Moreover, the first lens unit G1 is designed so that the object-side surface of the positive lens component L13 is configured as an aspherical surface whose refracting power changes progressively to take a negative value in going from the optical axis to the periphery thereof, and satisfies Condition (3). The first lens unit G1 is also designed so that the positive lens component L13 with the aspherical surface is made of plastic, and satisfies Condition (4).

Subsequently, numerical data of optical members constituting the wide-angle zoom lens of the ninth embodiment are shown.

Numerical data 9

$r_1$ = −17.0345
$d_1$ = 1.8200      $n_1$ = 1.83400      $v_1$ = 37.16
$r_2$ = −209.5024
$d_2$ = 0.3000
$r_3$ = 45.0005
$d_3$ = 5.7600      $n_3$ = 1.51633      $v_3$ = 64.14
$r_4$ = −53.2072
$d_4$ = 1.0900
$r_5$ = −103.7045
(aspherical)
$d_5$ = 2.3000      $n_5$ = 1.52542      $v_5$ = 55.78
$r_6$ = −54.9617
$d_6$ = 0.5000
$r_7$ = 26.1908
$d_7$ = 4.1000      $n_7$ = 1.48749      $v_7$ = 70.23
$r_8$ = −17.0214
$d_8$ = 1.0000
$r_9$ = ∞ (stop surface)
$d_9$ = (variable)
$r_{10}$ = −70.1810
$d_{10}$ = 2.8000      $n_{10}$ = 1.51633      $v_{10}$ = 64.14
$r_{11}$ = −23.6668
$d_{11}$ = 0.3500
$r_{12}$ = 51.3343
$d_{12}$ = 1.4000      $n_{12}$ = 1.53172      $v_{12}$ = 48.84
$r_{13}$ = −220.2378
$d_{13}$ = 4.4200
$r_{14}$ = −13.8417
$d_{14}$ = 1.7200      $n_{14}$ = 1.71300      $v_{14}$ = 53.87
$r_{15}$ = −491.4345
$d_{15}$ = bf
Aspherical coefficients
Fifth surface k = 0
$AC_2$ = 0               $AC_4$ = −7.2377 × 10$^{-5}$     $AC_6$ = −4.4771 × 10$^{-7}$
$AC_8$ = −1.6741 × 10$^{-11}$ Zoom data

|  | Wide-angle position | Middle position | Telephoto position |
|---|---|---|---|
| Focal length f | 28.97 | 54.43 | 77.19 |
| d9 | 14.30 | 5.46 | 2.50 |
| bf | 5.77 | 32.15 | 55.73 |
| ω(°) | 37.14 | 21.91 | 15.78 |
| Fno | 5.79 | 8.73 | 9.73 |

Variable magnification ratio: 2.66

The following data are values corresponding to Conditions (1)–(6) in the above embodiments.

| | Condition (1) | Condition (2) | Condition (3) | Condition (4) | Condition (5) | Condition (6) | 2 ω (°) |
|---|---|---|---|---|---|---|---|
| 1st embodiment | 0.733 | — | 2.9 | 7.71 | — | — | 76.2 |
| 2nd embodiment | 0.836 | — | 5.0 | 9.17 | — | — | 76.4 |
| 3rd embodiment | 0.744 | — | 1.7 | 4.62 | — | — | 76.2 |
| 4th embodiment | 0.780 | — | 6.1 | 13.81 | — | — | 76.2 |
| 5th embodiment | 0.931 | — | 5.0 | 13.67 | — | — | 76.2 |

-continued

| | Condition (1) | Condition (2) | Condition (3) | Condition (4) | Condition (5) | Condition (6) | 2 ω (°) |
|---|---|---|---|---|---|---|---|
| 6th embodiment | 0.741 | — | 2.6 | 7.40 | −0.140 | — | 75.8 |
| 7th embodiment | 0.841 | — | 4.2 | 8.30 | — | — | 75.0 |
| 8th embodiment | 0.708 | — | 2.6 | 7.20 | — | −0.131 | 75.4 |
| 9th embodiment | 0.972 | −1.177 | 1.301 | 9.53 | — | — | 74.3 |

Figure 13:
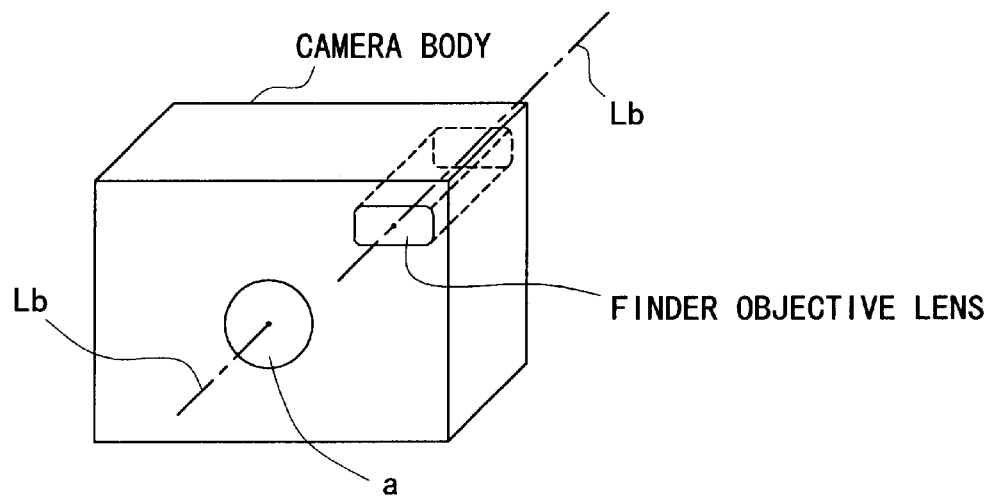
FIG. 13 is a perspective view showing an example of a photographing apparatus using the wide-angle zoom lens of the present invention as an objective lens.
Figure 14:
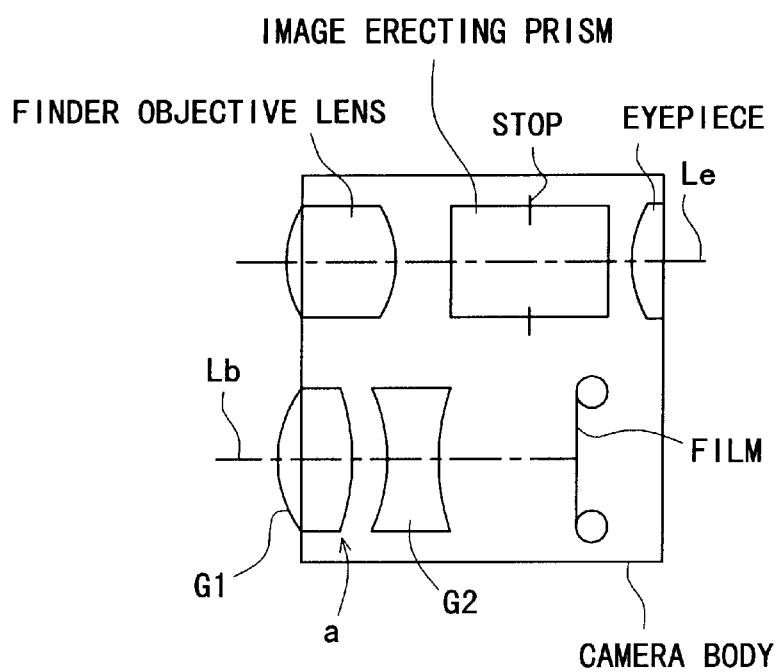
FIG. 14 is a sectional view showing a schematic structure of the photographing apparatus of FIG. 13.

The wide-angle zoom lens of the present invention mentioned above is used in a photographing apparatus which has a structure such as that shown, for example, in FIGS. 13 and 14, as a photographing objective lens a of a compact camera. In these figures, reference symbol Lb denotes a photographing optical path and Le denotes a finder optical path. The photographing optical path Lb and the finder optical path Le are parallel with each other. An image of an object is observed through a finder including a finder objective lens, an image erecting prism, a stop, and an eyepiece, and is formed on a film through the photographing objective lens.

The wide-angle zoom lens of the present invention can also be used as a photographing objective lens for a compact electronic camera which uses an electronic image sensor like a CCD instead of the film. In the wide-angle zoom lens of the present invention, it is desirable for cost, performance, and fabrication that the first lens unit is constructed with four single lens components.

What is claimed is:

1. A wide-angle zoom lens comprising, in order from object side:

a first lens unit with a positive refracting power; and
   a second lens unit with a negative refracting power,
   a space between said first lens unit and said second lens unit being changed, thereby varying a magnification of said zoom lens,
   wherein said first lens unit comprises a first lens component which is only one negative lens component in said first lens unit, placed at a most object-side position, and at least three positive lens components arranged on an image side of said first lens component so as to provide air spaces between said three lens components, and each of lens components constituting said first lens unit is constructed with a single lens element, _and
   wherein a stop is disposed in said space between said first lens unit and said second lens unit.

2. A wide angle zoom lens according to claim 1, wherein an object-side surface of said first lens component is concave toward the object side.

3. A wide-angle zoom lens according to claim 1, wherein said second lens unit includes, in order from said object side, at least three lens components with negative, positive, and negative refracting powers.

4. A wide-angle zoom lens according to claim 1, wherein said second lens unit includes, in order from said object side, at least two positive lens components and at least one negative lens component, providing air spaces therebetween, and at least one surface of said two positive lens components is aspherical.

5. A wide-angle zoom lens according to claim 4, wherein at least one of said two positive lens components of said second lens unit is a plastic lens element satisfying the following condition:

$$-0.15 < \Phi pp2/\Phi 2G < 0$$

where $\Phi pp2$ is a refracting power of said plastic lens element in said second lens unit and $\Phi 2G$ is a refracting power of said second lens unit.

6. A wide-angle zoom lens consisting of, in order from object side:

a first lens unit with a positive refracting power; and
   a second lens unit with a negative refracting power,
   a space between said first lens unit and said second lens unit being changed, thereby varying a magnification of said zoom lens,
   wherein said first lens unit comprises a first lens component which is only one negative lens component in said first lens unit, placed at a most object-side position, and at least three positive lens components arranged on an image side of said first lens component so as to provide air spaces between said three lens components, and each of lens components constituting said first lens unit is constructed with a single lens element, and
   wherein said first lens unit satisfies the following condition:

$$0.5 < |f1L/f1G| < 1$$

where f1L is a focal length of said first lens component constructed with a single negative lens component and f1G is a focal length of said first lens unit.

7. A photographing apparatus including a wide-angle zoom lens as a photographing objective lens, said wide-angle zoom lens comprising, in order from object side:

a first lens unit with a positive refracting power; and
   a second lens unit with a negative refracting power,
   a space between said first lens unit and said second lens unit being changed, thereby varying a magnification of said zoom lens,
   wherein said first lens unit comprises a first lens component which is only one negative lens component in said first lens unit, placed at a most object-side position, and at least three positive lens components arranged on an image side of said first lens component so as to provide air spaces between said three lens components, and each of lens components constituting said first lens unit is constructed with a single lens element, and
   wherein a stop is disposed in said space between said first lens unit and said second lens unit.

8. A wide-angle zoom lens consisting of, in order from object side:

a first lens unit with a positive refracting power; and
   a second lens unit with a negative refracting power,
   a space between said first lens unit and said second lens unit being changed, thereby varying a magnification of said zoom lens,
   wherein said first lens unit comprises a first lens component which is only one negative lens component in said first lens unit, placed at a most object-side position, and at least three positive lens components arranged on an image side of said first lens component so as to provide air spaces between said three lens components, and each of lens components constituting said first lens unit is constructed with a single lens element, _and
   wherein said first lens component is a biconcave lens.

9. A wide-angle zoom lens according to any one of claim 1, 6, 2 or 8, wherein a field angle at a wide-angle position is at least 70°.

10. A wide-angle zoom lens according to claim 1, 6, 2 or 8, wherein said first lens unit has at least one aspherical surface whose refracting power changes progressively to take a negative value in going from an optical axis to a periphery thereof, and satisfies the following condition:

$$0.6<(\Phi 0-\Phi 1)\times f\,asp<6.2$$

where f asp is a focal length of a lens component with the aspherical surface, and $\Phi 0$ is an axial refracting power of the aspherical surface, and $\Phi 1$ is an effective-diameter refracting power of the aspherical surface.

11. A wide-angle zoom lens according to claim 10, wherein said first lens unit includes a positive lens component made of plastic which has the aspherical surface, and satisfies the following condition:

$$3.5<fp/f1G<15$$

where fp is a focal length of said positive lens component made of plastic and f1G is a focal length of said first lens unit.

12. A wide-angle zoom lens comprising, in order from object side:
   a first lens unit with a positive refracting power; and
   a second lens unit with a negative refracting power,
   a space between said first lens unit and said second lens unit being changed, thereby varying a magnification of said zoom lens,
   wherein said first lens unit comprises a first lens component which is only one negative lens component in said first lens unit, placed at a most object-side position, and at least three positive lens components arranged on an image side of said first lens component so as to provide air spaces between said three lens components, and each of lens components constituting said first lens unit is constructed with a single lens element, and
   wherein said first lens component is shaped into a meniscus form in which a concave surface is directed toward said object side, and satisfies the following condition:

$$-2<(R1+R2)/(R1-R2)<-1$$

where R1 is a radius of curvature of an object-side surface of said first lens component and R2 is a radius of curvature of an image-side surface of said first lens component.

13. A wide angle zoom lens according to claim 12, wherein said first lens unit satisfies the following condition:

$$0.5<|f1L/f1C|<1$$

where f1L is a focal length of said first lens component constructed with a single negative lens component and f1C is a focal length of said first lens unit.

14. A wide-angle zoom lens comprising, in order from object side:
   a first lens unit with a positive refracting power; and
   a second lens unit with a negative refracting power,
   a space between said first lens unit and said second lens unit being changed, thereby varying a magnification of said zoom lens,
   wherein said first lens unit comprises a first lens component which is only one negative lens component in said first lens unit, placed at a most object-side position, and at least three positive lens components arranged on an image side of said first lens component so as to provide air spaces between said three lens components, and each of lens components constituting said first lens unit is constructed with a single lens element, and
   wherein said second lens unit comprises, in order from said object side, at least three lens components with positive, negative, and negative powers.

15. A wide-angle zoom lens comprising, in order from object side:
   a first lens unit with a positive refracting power; and
   a second lens unit with a negative refracting power,
   a space between said first lens unit and said second lens unit being changed, thereby varying a magnification of said zoom lens,
   wherein said first lens unit comprises a first lens component which is only one negative lens component in said first lens unit, placed at a most object-side position, and at least three positive lens components arranged on an image side of said first lens component so as to provide air spaces between said three lens components, and each of lens components constituting said first lens unit is constructed with a single lens element, and
   wherein said second lens unit consists of, in order from said object side, a lens component with a positive refracting power, having at least one aspherical surface, and a lens component with a negative refracting power.

16. A wide-angle zoom lens according to claim 15, wherein said second lens unit satisfies the following condition:

$$-0.15<\Phi p2/\Phi 2G<0$$

where $\Phi p2$ is a refracting power of said lens component with a positive refracting power, having the aspherical surface, and $\Phi 2G$ is a refracting power of said second lens unit.

17. A wide-angle zoom lens comprising, in order from object side:
   a first lens unit with a positive refracting power; and
   a second lens unit with a negative refracting power,
   a space between said first lens unit and said second lens unit being changed, thereby varying a magnification of said zoom lens,
   wherein said first lens unit comprises a first lens component which is only one negative lens component in said first lens unit, placed at a most object-side position, and at least three positive lens components arranged on an image side of said first lens component so as to provide air spaces between said three lens components, and each of lens components constituting said first lens unit is constructed with a single lens element, and
   wherein said second lens unit comprises a positive lens element which is a plastic lens element satisfying the following condition:

$$-0.15<\Phi pp2/\Phi 2G<0$$

where $\Phi pp2$ is a refracting power of said plastic lens element in said second lens unit and $\Phi 2G$ is a refracting power of said second lens unit.

18. A wide angle zoom lens according to claim 17, wherein said first lens unit satisfies the following condition:

$$0.5<|f1L/f1G|<1$$

where f1L is a focal length of said first lens component constructed with a single negative lens component and f1G is a focal length of said first lens unit.

19. A wide-angle zoom lens according to claim 17, wherein an object-side surface of said first lens component is concave toward the object side.

20. A wide-angle zoom lens according to claim 17, wherein said first lens component is a biconcave lens.

21. A wide-angle zoom lens comprising, in order from object side:

a first lens unit with a positive refracting power; and a second lens unit with a negative refracting power, a space between said first lens unit and said second lens unit being changed, thereby varying a magnification of said zoom lens, wherein said first lens unit comprises a first lens component which is only one negative lens component in said first lens unit, placed at a most object-side position, and at least three positive lens components arranged on an image side of said first lens component so as to provide air spaces between said three lens components, and each of lens components constituting said first lens unit is constructed with a single lens element, wherein said first lens unit satisfies the following condition:

$$0.5<|f1L/f1G|<1$$

where f1L is a focal length of said first lens component constructed with a single negative lens component and f1G is a focal length of said first lens unit, and wherein a most image-side positive lens component of said at least three positive lens components included in said first lens unit is a lens component having an image-side surface convex toward image side.

22. A wide-angle zoom lens comprising, in order from object side:

a first lens unit with a positive refracting power; and a second lens unit with a negative refracting power, a space between said first lens unit and said second lens unit being changed, thereby varying a magnification of said zoom lens, wherein said first lens unit comprises a first lens component which is only one negative lens component in said first lens unit, placed at a most object-side position, and at least three positive lens components arranged on an image side of said first lens component so as to provide air spaces between said three lens components, and each of lens components constituting said first lens unit is constructed with a single lens element, wherein said first lens unit satisfies the following condition:

$$0.5<|f1L/f1G|<1$$

where f1L is a focal length of said first lens component constructed with a single negative lens component and f1G is a focal length of said first lens unit, and wherein a most object-side positive lens component of said at least three positive lens components included in said first lens unit is a meniscus lens component.

23. A wide-angle zoom lens according to claims 1, 6, 21 or 22, wherein the space between said first lens unit and second lens unit is changed so as to be narrower in a telephoto position than in a wide-angle position.

24. A wide-angle zoom lens comprising, in order from object side:

a first lens unit with a positive refracting power; and a second lens unit with a negative refracting power, a space between said first lens unit and said second lens unit being changed, thereby varying a magnification of said zoom lens, wherein said first lens unit comprises a first lens component which is only one negative lens component in said first lens unit, placed at a most object-side position, and at least three positive lens components arranged on an image side of said first lens component so as to provide air spaces between said three lens components, and each of lens components constituting said first lens unit is constructed with a single lens element, wherein said first lens component is a biconcave lens component, and wherein a most image-side positive lens component of said at least three positive lens components included in said first lens unit is a lens component having an image-side surface convex toward image side.

25. A wide-angle zoom lens comprising, in order from object side:

a first lens unit with a positive refracting power; and a second lens unit with a negative refracting power, a space between said first lens unit and said second lens unit being changed, thereby varying a magnification of said zoom lens, wherein said first lens unit comprises a first lens component which is only one negative lens component in said first lens unit, placed at a most object-side position, and at least three positive lens components arranged on an image side of said first lens component so as to provide air spaces between said three lens components, and each of lens components constituting said first lens unit is constructed with a single lens element, wherein said first lens component is a biconcave lens component, and wherein a most object-side positive lens components of said at least three position lens components included in said first lens unit is a meniscus lens component.

* * * * *